United States Patent
Takubo

(10) Patent No.: US 8,046,627 B2
(45) Date of Patent: Oct. 25, 2011

(54) SERVER FAILOVER CONTROL METHOD AND APPARATUS AND COMPUTER SYSTEM GROUP

(75) Inventor: Shunji Takubo, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 129 days.

(21) Appl. No.: 12/628,296

(22) Filed: Dec. 1, 2009

(65) Prior Publication Data

US 2010/0146327 A1  Jun. 10, 2010

(30) Foreign Application Priority Data

Dec. 5, 2008  (JP) ................................. 2008-311096

(51) Int. Cl.
*G06F 11/20* (2006.01)

(52) U.S. Cl. ........................................ 714/4.11; 714/6.3

(58) Field of Classification Search ................... 714/4.1, 714/4.11, 4.12, 4.2, 4.21, 4.3, 4.5, 6.3, 11–13
See application file for complete search history.

(56) References Cited

U.S. PATENT DOCUMENTS

| | | | |
|---|---|---|---|
| 2007/0136447 A1 | 6/2007 | Nakajima et al. | |
| 2007/0239925 A1 | 10/2007 | Koishi | |
| 2010/0125735 A1* | 5/2010 | Zapata et al. | ................. 713/170 |

FOREIGN PATENT DOCUMENTS

| | | | |
|---|---|---|---|
| JP | 2007-164305 A | 6/2007 | |
| JP | 2007-280237 A | 10/2007 | |

* cited by examiner

*Primary Examiner* — Dieu-Minh Le
(74) *Attorney, Agent, or Firm* — Mattingly & Malur, PC

(57) ABSTRACT

Computer systems forming the computer system group each have a plurality of servers, a plurality of I/O devices, a plurality of servers, and one or more I/O switches coupled to the plurality of I/O devices, and it is possible to change the combination of the servers and I/O devices in each of the computer systems. If a fault has occurred in one of the current servers, firstly, it is judged whether or not there exists a spare server capable of taking over processing in a computer system including the server which has generated the fault. If the judgment result is negative, then a server switching process is carried out by searching another computer system capable of constructing a particular combination corresponding to the combination of the faulty server and the I/O devices allocated thereto.

19 Claims, 13 Drawing Sheets

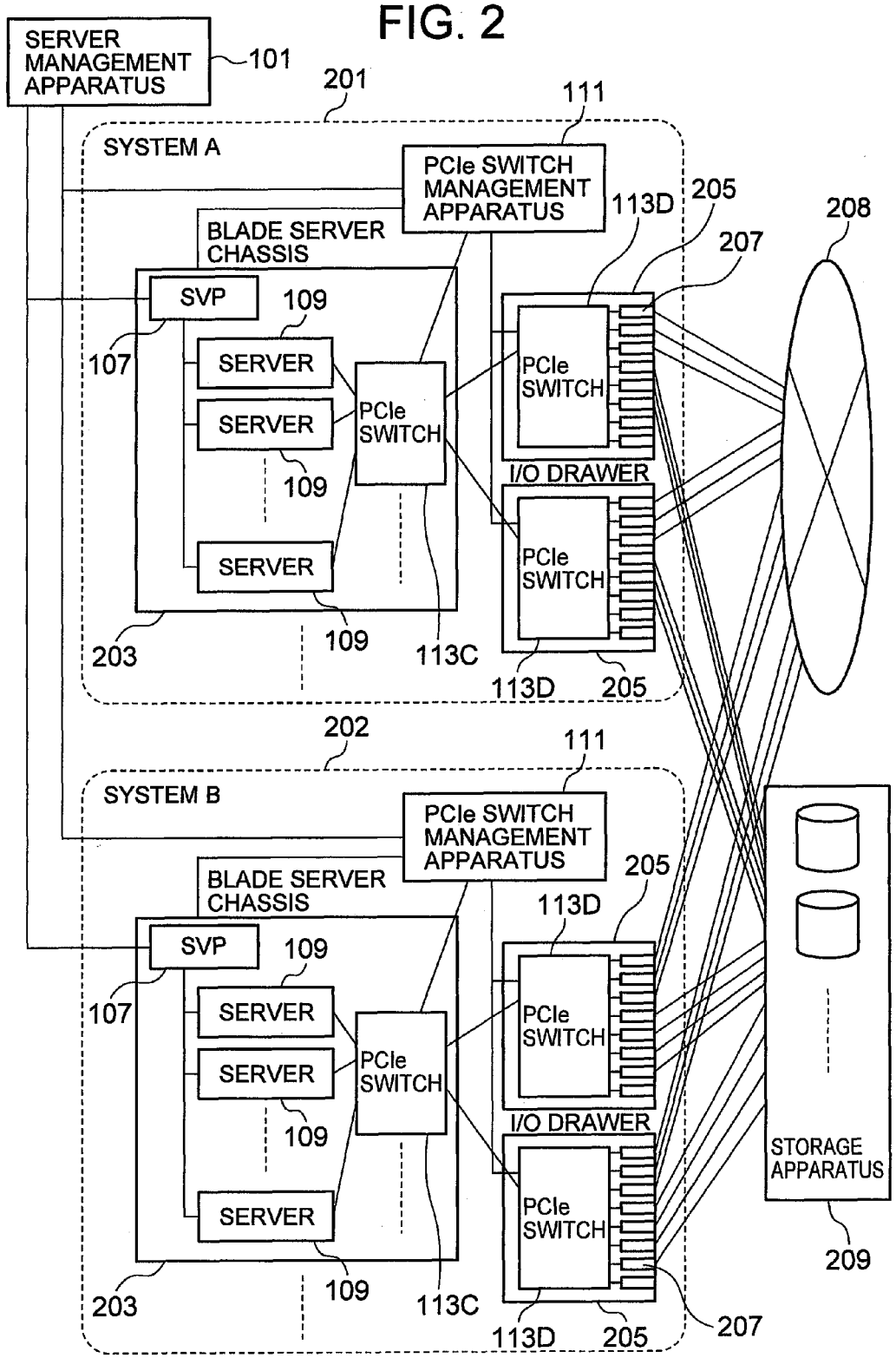

FIG. 3
MACHINE IN USE INFORMATION TABLE

| SYSTEM ID | SERVER | | | | I/O DEVICE | | | | |
| --- | --- | --- | --- | --- | --- | --- | --- | --- | --- |
| | CHASSIS ID | Slot No. | MODEL | I/O NUMBER | BUS NO. | TYPE | Boot | MODEL | IDENTIFIER |
| A | 1 | 1 | M1 | 3 | 1 | FC | ○ | HBA01 | ** |
| | | | | | 20 | FC | × | HBA01 | ** |
| | | | | | 30 | LAN | × | NIC01 | ** |
| | | 2 | M1 | 2 | 2 | FC | ○ | HBA02 | ** |
| | | | | | 21 | FC | × | HBA02 | ** |
| | | 3 | M2 | 4 | 3 | FC | ○ | HBA01 | ** |
| | | | | | 22 | FC | × | HBA01 | ** |
| | | | | | 31 | LAN | × | NIC01 | ** |
| | | | | | 32 | LAN | × | NIC01 | ** |
| | | 4 | M2 | 4 | 4 | FC | ○ | HBA01 | ** |
| | | | | | 23 | FC | × | HBA01 | ** |
| | | | | | 24 | FC | × | HBA02 | ** |
| | | | | | 33 | LAN | × | NIC02 | ** |
| | | 5 | M3 | 2 | 5 | FC | ○ | HBA03 | ** |
| | | | | | 25 | FC | × | HBA03 | ** |
| | | ... | ... | ... | ... | ... | ... | ... | ... |
| | 2 | 1 | M1 | 1 | 7 | FC | ○ | HBA01 | ** |
| | | 2 | M2 | 3 | 8 | FC | ○ | HBA01 | ** |
| | | | | | 35 | LAN | × | NIC01 | ** |
| | | | | | 36 | LAN | × | NIC01 | ** |
| | | 3 | M1 | 3 | 9 | FC | ○ | HBA01 | ** |
| | | | | | 27 | FC | × | HBA02 | ** |
| | | | | | 37 | LAN | × | NIC02 | ** |
| | | 4 | M1 | 2 | 10 | FC | ○ | HBA01 | ** |
| | | | | | 38 | LAN | × | NIC01 | ** |
| | | ... | ... | ... | ... | ... | ... | ... | ... |
| B | 1 | 1 | M1 | 2 | 16 | FC | ○ | HBA01 | ** |
| | | | | | 64 | LAN | × | NIC01 | ** |
| | | 2 | M1 | 2 | 15 | FC | ○ | HBA01 | ** |
| | | | | | 63 | LAN | × | NIC01 | ** |
| | | 3 | M3 | 2 | 14 | FC | ○ | HBA02 | ** |
| | | | | | 17 | FC | × | HBA02 | ** |
| | | ... | ... | ... | ... | ... | ... | ... | ... |
| | | ... | ... | ... | ... | ... | ... | ... | ... |

UNUSED SERVER INFORMATION TABLE

| SYSTEM | CHASSIS ID | SERVER | |
|---|---|---|---|
| | | Slot No. | MODEL |
| A | 1 | 7 | M1 |
| | | 8 | M3 |
| | 2 | 6 | M1 |
| | | 7 | M1 |
| | | 8 | M1 |
| B | 1 | 5 | M1 |
| | | 6 | M2 |
| | | 7 | M2 |
| | | 8 | M3 |
| | ... | ... | ... |
| ... | ... | ... | ... |

FIG. 5

UNUSED I/O DEVICE INFORMATION TABLE

| SYSTEM | BUS NO. | TYPE | Boot | MODEL | IDENTIFIER |
|---|---|---|---|---|---|
| A | 12 | FC | × | HBA01 | * * |
|   | 13 | FC | ○ | HBA01 | * * |
|   | 14 | FC | ○ | HBA01 | * * |
|   | 15 | FC | ○ | HBA02 | * * |
|   | 16 | FC | ○ | HBA02 | * * |
|   | ... | ... | ... | ... | ... |
| B | 1 | FC | ○ | HBA01 | * * |
|   | 2 | FC | ○ | HBA02 | * * |
|   | 3 | FC | ○ | HBA01 | * * |
|   | 4 | FC | ○ | HBA01 | * * |
|   | 5 | FC | ○ | HBA03 | * * |
|   | 6 | FC | ○ | HBA02 | * * |
|   | 7 | FC | ○ | HBA01 | * * |
|   | 8 | FC | ○ | HBA01 | * * |
|   | ... | ... | ... | ... | ... |
|   | 19 | FC | × | HBA01 | * * |
|   | 20 | FC | × | HBA01 | * * |
|   | 21 | FC | × | HBA02 | * * |
|   | 22 | FC | × | HBA03 | * * |
|   | ... | ... | ... | ... | ... |
|   | 60 | LAN | × | NIC01 | * * |
|   | 61 | LAN | × | NIC01 | * * |
|   | 62 | LAN | × | NIC02 | * * |

BASIC ATTRIBUTE INFORMATION TABLE

| SYSTEM NAME | CHASSIS INFORMATION ||
| --- | --- | --- |
| | CHASSIS ID | CHASSIS NAME |
| A | 1 | CHASSIS 01 |
| | 2 | CHASSIS 02 |
| | 3 | CHASSIS 03 |
| | 4 | CHASSIS 04 |

FIG. 12

I/O DRAWER INFORMATION TABLE

| IOD ID | IOD Slot NO. | BUS NO. | TYPE | Boot | MODEL | IDENTIFIER |
|---|---|---|---|---|---|---|
| 1 | 1 | 1 | FC | O | HBA01 | * * |
|   | 2 | 2 | FC | O | HBA02 | * * |
|   | 3 | 3 | FC | O | HBA01 | * * |
|   | 4 | 4 | FC | O | HBA01 | * * |
|   | 5 | 5 | FC | O | HBA03 | * * |
|   | ... | ... | ... | ... | ... | ... |
| 2 | 1 | 17 | FC | × | HBA02 | * * |
|   | 2 | 18 | FC | × | HBA02 | * * |
|   | 3 | 19 | FC | × | HBA01 | * * |
|   | 4 | 20 | FC | × | HBA01 | * * |
|   | 5 | 21 | FC | × | HBA02 | * * |
|   | 6 | 22 | FC | × | HBA01 | * * |
|   | 7 | 23 | FC | × | HBA01 | * * |
|   | 8 | 24 | FC | × | HBA02 | * * |
|   | ... | ... | ... | ... | ... | ... |
| ... |   |   |   |   |   |   |

Columns: 1201, 1202, 1203, 1204, 1205, 1206, 1207

FIG. 13

CONNECTION TOPOLOGY INFORMATION TABLE

| CHASSIS ID (1301) | Slot NO. (1302) | I/O NUMBER (1303) | BUS NO. (1304) |
|---|---|---|---|
| 1 | 1 | 3 | 1 |
|   |   |   | 20 |
|   |   |   | 30 |
|   | 2 | 2 | 2 |
|   |   |   | 21 |
|   | 3 | 4 | 3 |
|   |   |   | 22 |
|   |   |   | 31 |
|   |   |   | 32 |
|   | 4 | 4 | 4 |
|   |   |   | 23 |
|   |   |   | 24 |
|   |   |   | 33 |
|   | 5 | 2 | 5 |
|   |   |   | 25 |
|   | ... | ... | ... |
| 2 | 1 | 1 | 7 |
|   | 2 | 3 | 8 |
|   |   |   | 35 |
|   |   |   | 36 |
|   | 3 | 3 | 9 |
|   |   |   | 27 |
|   |   |   | 37 |
|   | 4 | 2 | 10 |
|   |   |   | 38 |
|   | ... | ... | ... |

SERVER FAILOVER CONTROL METHOD AND APPARATUS AND COMPUTER SYSTEM GROUP

CROSS-REFERENCE TO PRIOR APPLICATION

This application relates to and claims the benefit of priority from Japanese Patent Application number 2008-311096, filed on Dec. 5, 2008 the entire disclosure of which is incorporated herein by reference.

BACKGROUND

The present invention generally relates to failover for servers.

A cold standby system such as that described below, for example, is known as a server failover system. More specifically, a plurality of servers are connected in an accessible fashion to the same storage apparatus, and a spare server (replacement server) is prepared in respect of the current server (operating server) of the plurality of servers. If a fault occurs in the current server and it becomes impossible to continue processing, then the spare server is started up and the OS, application, or the like, running on the current server is loaded from a particular storage area inside the storage apparatus (for example, from the system volume which is the logical volume where the OS (Operating System) or application, or the like, is stored). By this means, the processing is taken over from the current server to the spare server, and the spare server can operate as the current server.

The storage apparatus which can be accessed from the plurality of servers is provided with security measures in order to prevent mistaken access to a particular storage area (for example, a logical volume) by a server that is not originally supposed to perform access. If connections are made by fiber channel, then access rights are controlled by using an identifier such as a World Wide Name (WWN) which is assigned to the host bus adapter (HBA) mounted on the server side. In order for the spare server to be able to use directly the storage area being used by the current server, it is necessary for the access rights to be passed on (taken over) appropriately in the event of a failover. The first and second technologies described below are technologies for passing on access rights.

A first technology is a method which exchanges the WWN of the HBA mounted on the server. According to this method, in the event of failover, the WWN is changed between the HBA mounted on the current server and the HBA mounted on the spare server. This method is disclosed in Japanese Patent Application Publication No. 2007-164305.

A second technology is a method which uses an I/O (Input/Output) switch. The I/O switch is provided between the server and an I/O device (for example, a HBA or NIC (Network Interface Card)). If a fault has occurred in the current server, then the I/O device used by the current server is allocated to the spare server by changing the settings of the I/O switch. By this means, the spare server is able to take over the storage area inside the storage apparatus which was accessed by the current server via the I/O device. This method is disclosed in Japanese Patent Application Publication No. 2007-280237, for instance.

SUMMARY

In the first technology described above, there are limitations in that the current server and the spare server must have the same I/O configuration. The I/O configuration is the configuration relating to I/O operations, and more specifically, is defined in terms of the number of I/O devices, the type of I/O devices, the sequence of I/O devices, and the like, for example. Since the limitations described above exist, then it is not possible to use one spare server to correspond to a plurality of current servers having different I/O configurations, and hence there is a problem in that at least one spare server must be prepared respectively for each current server having a different I/O configuration.

In the second technology described above, the allocation of I/O devices used by the current server is changed and the I/O devices can be allocated directly to the spare server. Consequently, it is possible to make one spare server correspond to a plurality of current servers which have different I/O configurations. In other words, it is also possible to eliminate the problems relating to the first technology.

However, in the second technology, it is necessary to be able to connect the current server and the spare server to the same I/O device by means of a I/O switch. Therefore, even if one spare server can be used to correspond to a plurality of current servers, that spare server must be connected to the I/O devices which are connected to this plurality of current servers.

Therefore, the object of the present invention is to be able to achieve failover of servers even if the current server and the spare server have different I/O configurations, and to improve the flexibility of the system configuration.

A plurality of servers, a plurality of I/O devices, a plurality of servers, and one or more I/O switches connected to the plurality of I/O devices are provided in the respective computer systems which form the computer system group, and in each of the computer systems, it is possible to change the combination of the servers and I/O devices. If a fault has occurred in one of the current servers, firstly, it is judged whether or not there exists a spare server capable of taking over processing in the computer system including the server which has generated the fault. If the judgment result is negative, then a server switching process is carried out by searching for another computer system which is capable of constructing a particular combination corresponding to the combination of the faulty server and the I/O devices allocated thereto. In this server switching process, the following processes (A) to (C) are carried out:

(A) combination construction processing for constructing the particular combination in the searched other computer system by allocating particular I/O devices located in the same computer system as the spare server capable of taking over processing which is located in the other computer system;

(B) identifier exchange processing for exchanging identifiers of the I/O devices which have been allocated to the faulty server with identifiers allocated to the particular I/O device; and (C) a start-up process for starting up the spare server capable of taking over processing.

It is possible to ease both the restriction which is a problem associated with the first technology and the restriction which is a problem associated with the second technology. In other words, it is possible to ease both the restriction that the current server and the spare server must have the same I/O configuration, and the restriction that the current server and the spare server must be connectable to the same I/O device via the same I/O switch.

BRIEF DESCRIPTION OF THE DRAWINGS

FIG. 2 shows the configuration of a computer system group relating to a first embodiment of the present invention;

FIG. 3 shows the configuration of a machine in use information table in a configuration information table;

FIG. 4 shows the configuration of an unused server information table in a configuration information table;

FIG. 5 shows the configuration of an unused I/O device information table in a configuration information table;

FIG. 11 shows the configuration of a basic attribute information table held by a PCIe switch management apparatus;

FIG. 12 shows the configuration of an I/O drawer information table held by a PCIe switch management apparatus; and FIG. 13 shows the configuration of a connection topology information table held by a PCIe switch management apparatus.

DETAILED DESCRIPTION OF THE EMBODIMENT

Figure 1:
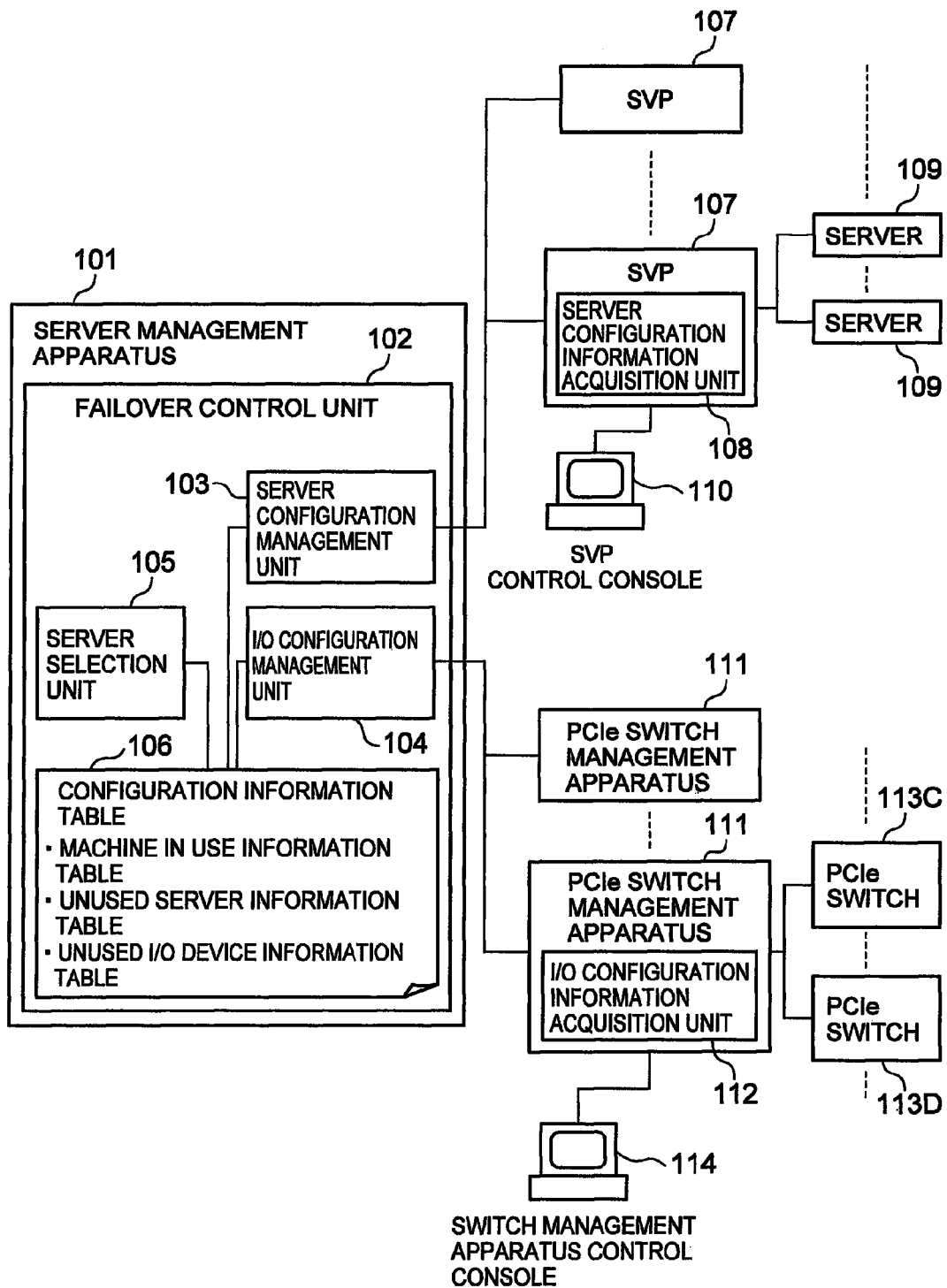
FIG. 1 shows the main functions of a first embodiment of the present invention.

Below, several embodiments of the present invention will be described with reference to the drawings.

First Embodiment

FIG. 2 shows a general overview of a computer system group relating to a first embodiment of the present invention.

The computer system group relating to the first embodiment comprises, as a plurality of computer systems, two computer systems 201 and 202 of system A and system B (of course, the number of computer systems is not limited to two). Below, the computer system 201 is described by way of a representative example.

A blade server, for example, is used as the server. One or more server 109, a service processor (SVP) 107 and a PCI Express switch (PCIe switch) 113C are mounted on a blade server chassis 203.

The SVP 107 performs overall management of the blade server chassis 203 and the servers 109 mounted thereon and, for example, gathers information relating to the switching on and off of the power supply of these apparatuses, and their attributes, statuses, and so on.

The PCIe switch 113C is connected, on the one hand, to the respective servers 109 by a dedicated network inside the chassis 203, and is connected, on the other hand, to PCIe switches 113D inside an I/O drawer 205. The PCIe switches 113D are connected, on the one hand, to the PCIe switch 113C, and are connected, on the other hand, to I/O devices 207 which are inserted into PCIe slots (not illustrated) of I/O drawers 205. The I/O devices 207 are devices for connecting the computer system 201 to a machine that is external to the computer system 201. The I/O devices 207 are HBAs or NICs, and if the device is an HBA, it is connected to a storage apparatus (for example, a disk array apparatus) 209 by a fiber channel, and if the device is an NIC, it is connected to an external network (for example, a LAN (Local Area Network)) 208.

In one computer system 201, the PCIe switch 113C in the chassis 203 and the PCIe switches 113D in the drawers 205 are connected to a PCIe switch management apparatus 111. This PCIe switch management apparatus 111 controls the respective switch settings, such as the connection structure.

The chassis 203 and the drawers 205 may be connected in a one-to-one correspondence, or in a many-to-one correspondence, or as shown in the example in FIG. 2, in a one-to-many correspondence. The I/O devices 207 in the drawers 205 are allocated to the servers 109 in the chassis 203.

The computer systems 201 and 202 are independent in terms of the allocation of I/O devices 207. Therefore, it is not possible to allocate the I/O devices 207 in the computer system 202 to the servers 109 in the computer system 201, or vice versa. The PCIe switch management apparatus 111 controls the PCIe switches 113C and 113D located in the computer system 201 (or 202) where the apparatus 111 is provided, and does not control the PCIe switches 113C and 113D located in the other computer system 202 (or 201).

A server management apparatus 101 is provided in respect of the computer systems 201 and 202. The server management apparatus 101 is connected in a communicable fashion with the PCIe switch management apparatuses 111 and the SVPs 107 in the computer systems 201 and 202, via a communications network such as a LAN, for example. The plurality of computer systems 201 and 202 are placed under the management of the server management apparatus 101, which performs overall management of the systems. In the present embodiment, a plurality of computer systems 201 and 202 which are under the management of one server management apparatus 101 is called a computer system group.

FIG. 1 shows the principal functions in a computer system group relating to the first embodiment of the present invention.

The SVPs 107 each have a server configuration information acquisition unit 108. The server configuration information acquisition unit 108 gathers information relating to the servers in the computer system including that SVP 107. A user (such as an administrator), for example, is able to input various types of information to the SVP 107 by operating a SVP control console 110.

The PCIe switch management apparatuses 111 each have an I/O configuration information acquisition unit 112. The I/O configuration information acquisition unit 112 gathers information relating to the I/O devices. A user (such as an administrator), for example, is able to input various types of information to the PCIe switch management apparatus 111 by operating the switch management apparatus control console 114.

The server management apparatus 101 has a failover control unit 102 which controls failover operations. The failover control unit 102 comprises a server configuration management unit 103, an I/O configuration management unit 104, a server selection unit 105 and a configuration information table 106. The configuration information table 106 is stored in a storage resource (for example, a memory) belonging to the server management apparatus 101.

The server configuration management unit 103 gathers from the SVPs 107 information relating to the servers 109 in the computer system group which are the object of management by the server management apparatus 101, and this information is reflected in the configuration information table 106.

The I/O configuration management unit 104, in cooperation with the PCIe switch management apparatuses 111 in the respective computer systems, gathers the setting information of the PCIe switches 113, performs control for changing settings, gathers attribute information in respect of the I/O devices, and the like.

The server selection unit 105 selects the spare server which is to form the failover destination.

In the present embodiment, the server configuration information acquisition unit 108, the I/O configuration information acquisition unit 112, the server configuration management unit 103, the I/O configuration management unit 104 and the server selection unit 105 are functions which are achieved by means of a microprocessor executing a computer program, but at least one of these may be achieved as hardware, by forming an integrated circuit, or the like.

The configuration information table 106 is a table which includes a machine in use information table, an unused server information table, and an unused I/O adapter information table.

Next, the details of the configuration information table 106 are described with reference to FIG. 3, FIG. 4 and FIG. 5.

FIG. 3 shows the configuration of the machine in use information table.

The machine in use information table includes a system ID 301. The system ID 301 is an identifier which is allocated to each computer system.

Furthermore, the machine in use information table includes information relating to the server currently in use (in other words, the current server) and the I/O devices, and this information contains, for example, a chassis ID 302, a slot number 303, a model 304 and an I/O number 305.

The chassis ID 302 is an identifier which is allocated to the chassis 203. The chassis ID 302 is an identifier which is allocated uniquely within a system, and the chassis ID can be duplicated in chassis belonging to different systems.

The slot number 303 is an identification number allocated to a slot in the chassis 203 (for example, the slot into which a server 109 is inserted) (hereinafter, called server slot), and the slot numbers can be duplicated between different chassis. A slot number 303 is allocated to the respective server slots regardless of whether or not a server 109 is installed in the server slot.

The model 304 is an identifier assigned to each model of server, and indicates the type of server 109 installed in the server slot indicated by the slot number 303.

The I/O number 305 indicates the number of I/O devices allocated to the server in question.

Furthermore, the machine in use information table includes information relating to the I/O devices currently in use, and this information contains, for example, a bus number 306, type 307, boot 308, model 309 and identifier 310.

The bus number 306 is a number which is allocated to the PCIe slot into which the I/O device in question is inserted. A bus number 306 is allocated to each PCIe slot, regardless of whether or not an I/O device is installed in the PCIe slot.

The type 307 is information which represents the type of the I/O device in question. The type 307 may be "FC" which means that the I/O device is an HBA, or "LAN" which means that the I/O device is an NIC.

The boot 308 is a flag which indicates whether or not the I/O device is a boot device. "O" means that the device is a boot device. A boot device is an I/O device which is connected to a storage area which stores information such as an OS or application, or the like (for example, a logical volume in a storage apparatus). It is possible to start up operation via a boot device, but not via an I/O device other than a boot device.

The model 309 is an identifier which represents the model of the I/O device in question (for example, a model number).

The identifier 310 is the identifier of the I/O device. For example, if the I/O device is an HBA, then the identifier 310 is a WWN, and if the I/O device is an NIC, then the identifier 310 is a MAC address.

The following can be deduced from FIG. 3, for instance. More specifically, it can be seen that in system A (computer system 201), there are two chassis, and a server whose model is "M1" is installed in the server slot having slot number "1" which belongs to the chassis 203 having a chassis ID of "1"; three I/O devices are allocated to that server. Furthermore, it can be seen that, of these three I/O devices, the boot device is an HBA which is inserted into the PCIe slot having bus number "1", and the model of this HBA is "HBA01". Moreover, of the other two I/O devices of these three I/O devices, one is an HBA and the other is an NIC.

The table shown in FIG. 3 is a table which records information relating to the machines in use, whereas the tables shown in FIG. 4 and FIG. 5 are tables which record information relating to unused machines. Unused machines are unused servers and unused I/O devices. Basically, since an unused I/O device is not allocated to an unused server 109, then the information relating to the unused servers and the information relating to the unused I/O devices are managed in separate tables.

FIG. 4 shows the configuration of the unused server information table.

The unused server information table includes a system ID 401, chassis ID 402, slot number 403 and model 404. The information 401 to 404 is similar to the information 301 to 304 described with reference to FIG. 3. The unused server information table does not include information corresponding to the I/O number 305 which was described with reference to FIG. 3. This is because, as stated previously, I/O devices are not allocated to an unused server (a spare server).

FIG. 5 shows the configuration of the unused I/O device information table.

The unused I/O device information table contains a system ID 501 which is information that represents which I/O device is present in which computer system. Apart from this, the unused I/O device information table contains a bus number 502, type 503, boot 504, model 505 and identifier 506, which is information similar to the information 306 to 310 described with reference to FIG. 3. An unused I/O device is an I/O device which has not been allocated to any server 109.

Figure 10:
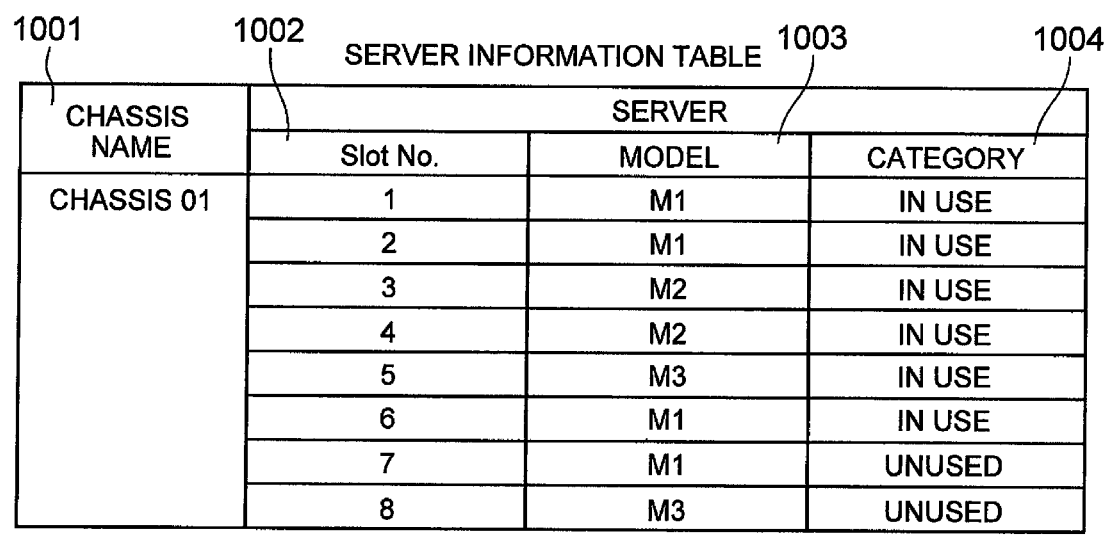
FIG. 10 shows the configuration of a server information table held by an SVP.

The tables shown in FIG. 3 to FIG. 5 are constructed on the basis of information managed by the SVPs 107 and the information managed by the PCIe switch management apparatus 111. FIG. 10 shows one example of the information managed by an SVP 107, and FIG. 11 to FIG. 13 show examples of the information managed by a PCIe switch management apparatus 111.

FIG. 10 shows the configuration of a server information table.

The server information table contains a chassis name 1001, which is the name of the chassis 203 which includes the SVP 107. The chassis name 1001 is input, for example, by a user (such as an administrator) when making the initial settings, or the like.

Moreover, the server information table also includes, for each server slot belonging to that chassis 203, a slot number 1002, a model 1003 (information indicating the model of server), and a category 1004. The model 1003 is information which is gathered by the server configuration information acquisition unit 108 of the SVP 107 from the respective servers 109 which have been inserted into the respective server slots. The category 1004 is information indicating whether the server 109 is in use (operating state (for example, a power on state)) or in an unused state (for example, in hibernation or in a power off state).

FIG. 11 shows the configuration of the basic attribute information table.

The basic attribute information table contains a system name 1101 which is the name of the computer system which contains the PCIe switch management apparatus 111. The system name 1101 is input, for example, by a user (such as an administrator) when making the initial settings, or the like.

Furthermore, the basic attribute information table includes, for each chassis 203 belonging to that computer system, a chassis ID 1102 and a chassis name 1103. An identifier (chassis ID) is allocated automatically to each chassis by the PCIe switch management apparatus 111.

FIG. 12 shows the configuration of an I/O drawer information table.

The I/O drawer information table contains, for each I/O drawer 205 in the computer system containing the PCIe switch management apparatus 111, an IOD ID 1201, IOD slot number 1202, bus number 1203, type 1204, boot 1205, model 1206 and identifier 1207. The IOD ID 1201 is an identifier for uniquely identifying the I/O drawer 205 in that computer system, and is, for example, input by a user (for example, the administrator) when making initial settings, or the like. The IOD slot number 1202 is a number for uniquely identifying a PCIe slot within an I/O drawer. In contrast to the bus number 1203, the IOD slot numbers 1202 may be duplicated in the same computer system, provided that the I/O drawer is different, as shown in FIG. 12. The bus number 1203, type 1204, boot 1205, model 1206 and identifier 1207 are similar to the information 306 to 310 described with reference to FIG. 3.

FIG. 13 shows the configuration of the connection topology information table.

The connection topology information table contains, for each chassis 203 in the computer system including the PCIe switch management apparatus 111, a chassis ID 1301 which is an identifier of the chassis 203, a slot number 1302 which is a number of a server slot of the chassis 203, an I/O number 1303 which is the number of I/O devices allocated to the server inserted into that server slot, and a bus number 1304 which is an identification number of the PCIe slot into which that I/O device is inserted.

The tables shown in FIG. 11 to FIG. 13 are created or updated when the system is constructed for the first time or when there is a change in the system composition. On such occasions, the information recorded in the tables shown in FIG. 11 to FIG. 13 is gathered, and the configuration information table 106 managed by the server management apparatus 101 (the table show in FIG. 3 to FIG. 5) is updated.

For example, the server configuration information acquisition unit 108 belonging to a SVP 107 gathers information relating to the servers 109, from the servers 109 in the chassis 203 which includes that SVP 107. More specifically, for example, if a server 109 is newly installed in a chassis 203, then this fact is detected by the SVP 107, and the server configuration information acquisition unit 108 in the SVP 107 gathers the slot number, server model and category information (information indicating whether or not the server is in use or unused), from the newly installed server 109. The server configuration information acquisition unit 108 then sends the gathered slot number, server model and category information, together with the chassis name, to the server configuration management unit 103 in the failover control unit 102. Upon receiving this various information, the server configuration management unit 103 reflects the received information in the configuration information table 106. In this case, the server configuration management unit 103 judges whether or not the newly installed server 109 is in use, on the basis of the category information, and if the server is in use, then the server configuration management unit 103 updates the machine in use information table shown in FIG. 3, on the basis of the received information, and if the server is not in use, the server configuration management unit 103 updates the unused server information table shown in FIG. 4.

The information relating to I/O devices is gathered by the PCIe switch management apparatus 111. More specifically, for example, if the connection topology is changed, then the I/O configuration information acquisition unit 112 in the PCIe switch management apparatus 111 extracts the topology information managed from the respective PCIe switches 113C and 113D, from these switches, and updates the connection topology information table. Furthermore, the I/O configuration information acquisition unit 112 extracts from the tables shown in FIG. 11 and FIG. 12, information relating to the slot number and bus number associated with the updated connection topology. The I/O configuration information acquisition unit 112 reports the information relating to the connection topology after the change and the information extracted from the table shown in FIG. 11 and FIG. 12, to the I/O configuration management unit 104 of the failover management unit 102. The I/O configuration management unit 104 which has received this information updates the configuration information table 106 on the basis of the information. It is judged whether or not the I/O device is in use or is unused, by the following method, for example. More specifically, an I/O device corresponding to a bus number which has been associated with any of the slot numbers is judged to be in use, and an I/O device corresponding to a bus number which has not been associated with any slot number is judged to be unused.

According to the information shown in FIG. 10 to FIG. 13 and the description given above, the table shown in FIG. 3 can be constructed as described below. More specifically, from the table shown in FIG. 10, it is possible to identify the chassis name 1001 and the slot number 1002 and model 1003 corresponding to a category 1004 of "in use", and using the chassis name 1001 as a key, the chassis ID 1103 can be identified from the table shown in FIG. 11, using the chassis ID 1103 and slot number 1002 corresponding to category information of "in use" as a key, it is possible to identify the I/O number 1303 and bus number 1304 from the table shown in FIG. 13, using the bus number 1304 as a key, it is possible to identify the type 1204, boot 1205, model 1206 and identifier 1207, from the table shown in FIG. 12, and hence the machine in use information table shown in FIG. 3 can be constructed on the basis of the information thus identified.

Figure 6:
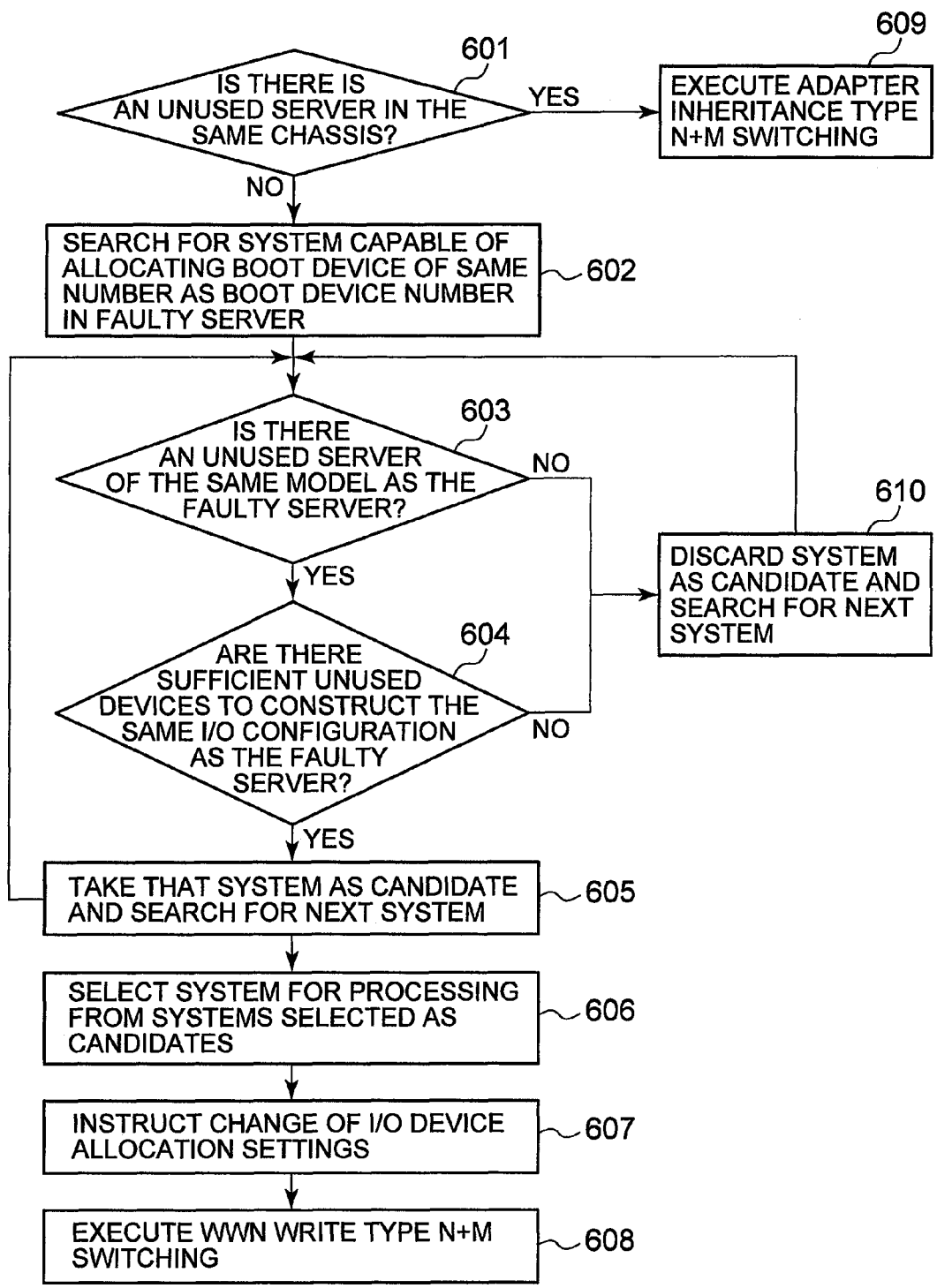
FIG. 6 is a flowchart of failover processing.

As shown in gray in FIG. 3, it is supposed that a fault has occurred in the server 109 inserted into slot 3 (the server slot having slot number "3") of a particular chassis 1 (the chassis having chassis ID "1") inside the computer system 201 (system A). The occurrence of this fault is detected by a prescribed application in the server management apparatus 101, for example, and the application instructs the server selection unit 105 of the failover control unit 102 to select a spare server which is to form a failover destination. At this stage, the failover processing shown in FIG. 6 is started.

Below, the flow of the failover processing carried out in the present embodiment will be described with reference to FIG. 6. In this case, the overall composition shown in FIG. 2 and the system configuration described in the tables shown in FIG. 3 to FIG. 5 are taken as examples. Furthermore, a server in which a fault has occurred is called a "faulty server".

At step 601, the server selection unit 105 refers to the unused server information table shown in FIG. 4 and judges whether or not there is an unused server 109 of the same model as the faulty server 109, in the system A which includes the faulty server 109. If the result of the judgment in step 601 is affirmative (Step 601: Yes), then step 609 is carried out. In other words, the unused server 109 is selected as the failover destination, and adapter inheritance type N+M switching is carried out. This switching can adopt the switching according to the second technology described above.

Incidentally, in this example, the judgment result at step 601 is negative. The reason for this is that the model of the faulty server 109 is "M2", whereas, according to the unused server information table, there is no unused server of the model "M2" in system A. Therefore, step 602 is carried out.

At step 602, the server selection unit 105 identifies the boot device of the faulty server 109 and also identifies the bus number 306, type 307 and model 308 corresponding to the boot device, by referring to the boot 308 in the machine in use information table. The server selection unit 105 then refers to the unused I/O device information table and searches another system which includes an unused boot device (hereinafter, called identified unused boot device) that corresponds to a bus number 502, type 503 and model 504 which match the identified bus number 306, type 307 and model 308.

At step 603, the server selection unit 105 refers to the unused server information table in the other system B thus searched, and judges whether or not there is an unused server of the same model as the faulty server 109. If the result of the judgment at step 603 is affirmative (step 603: Yes), then step 604 is carried out, and if the result of the judgment at step 603 is negative (step 603: No), then step 610 is carried out.

Incidentally, in this example, the judgment result at step 603 is affirmative. This is because the model of the faulty server 109 is "M2", and, according to the unused server information table, there are unused servers of the model "M2" in slots 6 and 7 of system A. Here, it is supposed that the unused server inserted into slot 6 is selected, as indicated by the gray shading in FIG. 4. If a plurality of unused servers of the same model as the faulty server are found in this way, then one unused server can be selected by means of any desired method.

At step 604, the server selection unit 105 refers to the unused I/O device information table and judges whether or not there are sufficient unused I/O devices for constructing the same I/O configuration as the faulty server, in the system B which was searched at step 602. In other words, it is judged whether or not the system B searched at step 602 includes non-boot devices which are equivalent to the non-boot devices (I/O devices other than boot devices) allocated to the faulty server, in equal or greater number to the non-boot devices allocated to the faulty server. If the result of the judgment at step 604 is affirmative (step 604: Yes), then step 605 is carried out, and if the result of the judgment at step 604 is negative (step 604: No), then step 610 is carried out. At step 610, the server selection unit 105 discards the searched system B as a candidate and searches for a system other than system B as a system having the identified unused boot device.

Incidentally, in this example, the judgment result at step 604 is affirmative. This is because system B includes three I/O devices respectively having the same type and model as the three I/O devices other than boot devices which are allocated to the faulty server. More specifically, this is because, according to the machine in use information table shown in FIG. 3, of the four I/O devices allocated to the faulty server, the three I/O devices other than boot devices are the following I/O devices (604A) to (604C):

(604A) an I/O device of type "FC" and model "HBA01";
(604B) an I/O device of type "LAN" and model "NIC01"; and
(604C) an I/O device of type "LAN" and model "NIC01"; and according to the unused I/O device information table shown in FIG. 5, as indicated by the gray shading, system B includes the following unused I/O devices (604*a*) to (604*c*):

(604*a*) an unused I/O device corresponding to the type "FC", model "HBA01" and bus number "19", which is a device corresponding to the (604A) described above;
(604*b*) an unused I/O device corresponding to the type "LAN", model "NIC01" and bus number "60", which is a device corresponding to the (604B) described above; and
(604*c*) an unused I/O device corresponding to the type "LAN", model "NIC01" and bus number "61", which is a device corresponding to the (604C) described above.

At step 605, the server selection unit 105 takes the searched system B as a candidate and searches for a system other than system B as a system having the identified unused boot device. If a further system of this kind is found, then step 603 is carried out, and if it is not found, then step 606 is carried out.

At step 606, the server selection unit 105 selects one system from the plurality of systems selected as candidates (systems other than system A which includes the faulty server). Here, it is possible to select a system which satisfies conditions considered to be optimal, on the basis of the attributes relating to the plurality of systems forming candidates and the attributes of the system A which includes the faulty server, and it is also possible to select one system at random.

Figure 7:
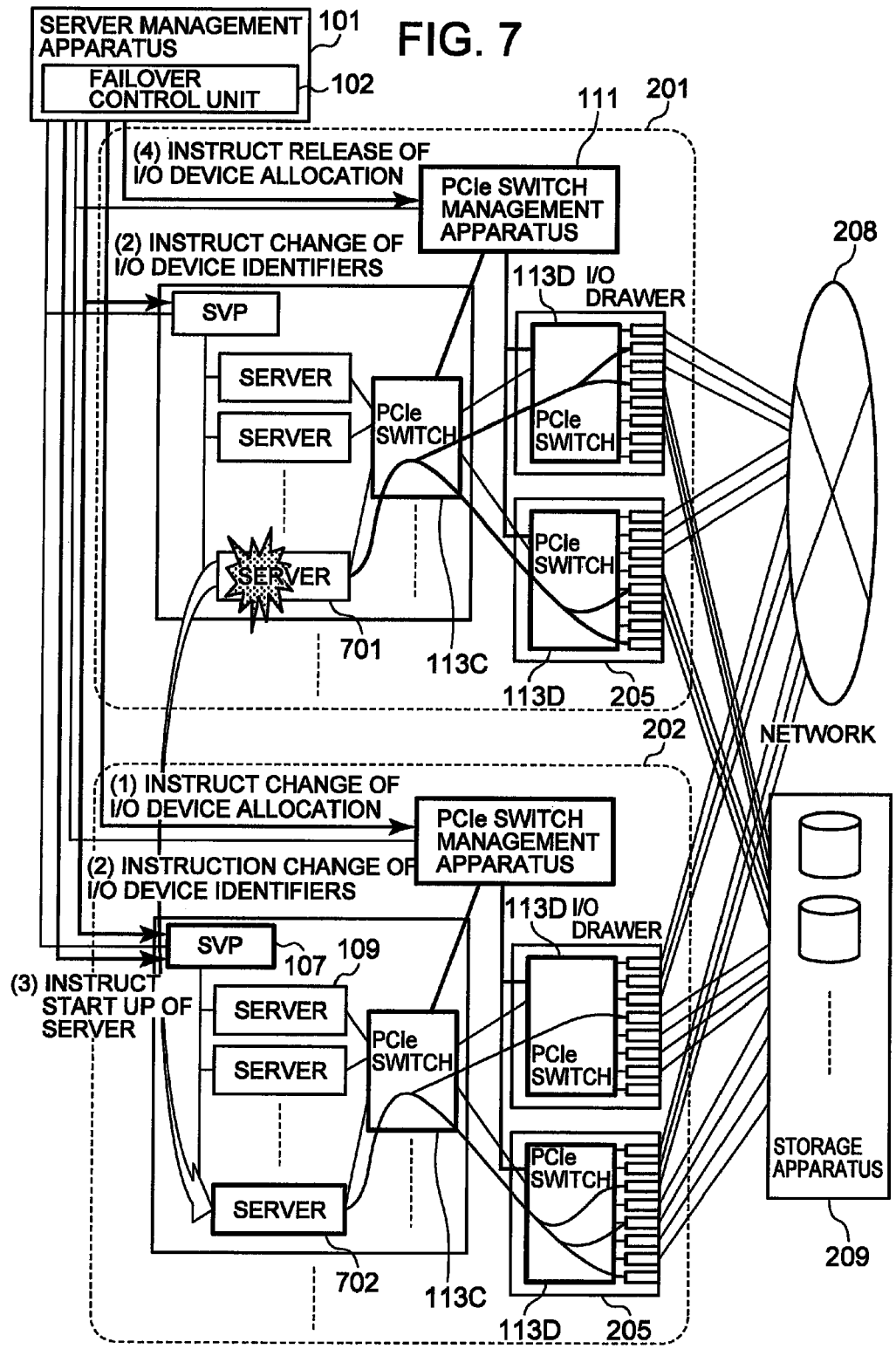
FIG. 7 shows an overview of a server switching process.
Figure 8:
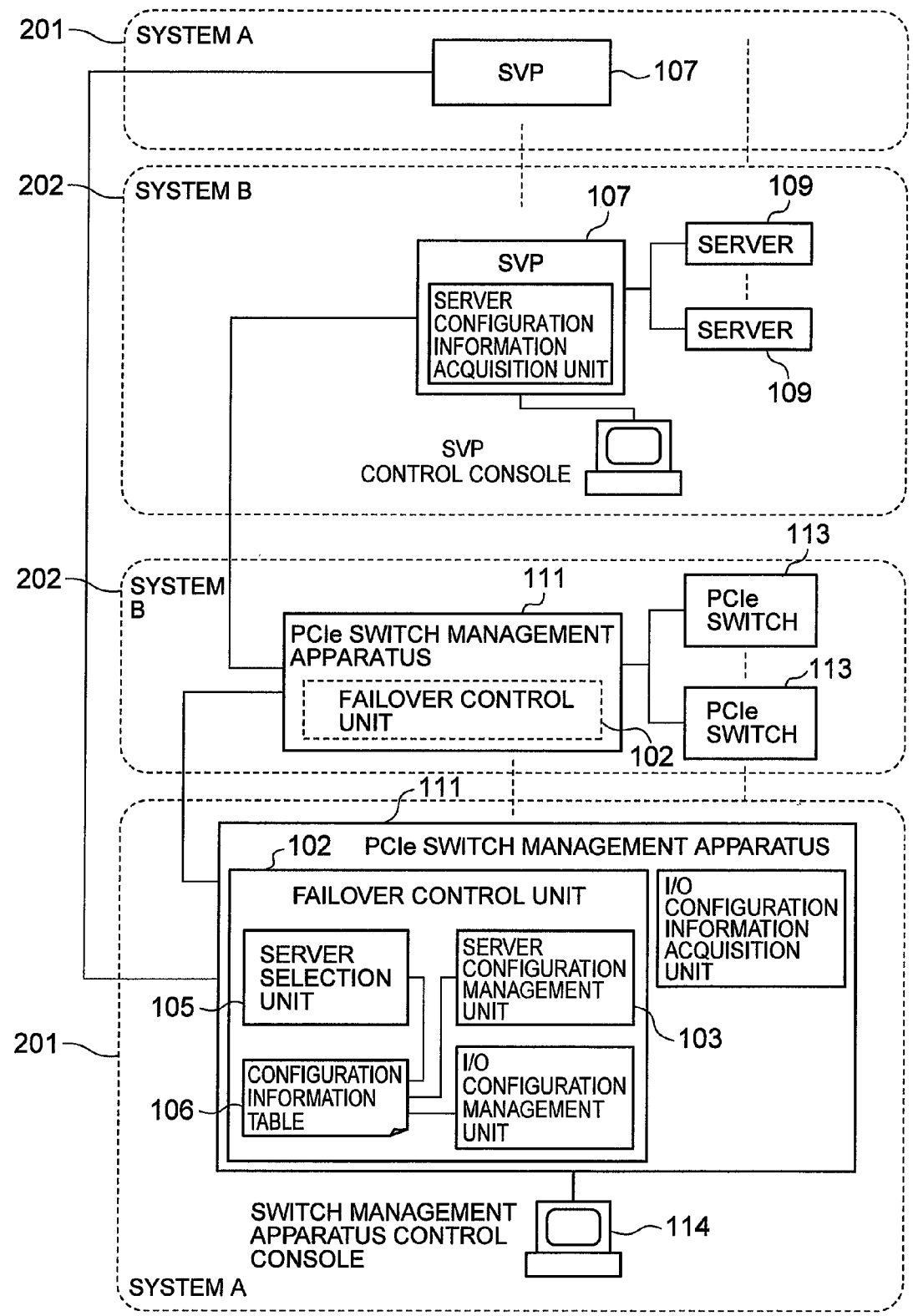
FIG. 8 shows the main functions of a second embodiment of the present invention.
Figure 9:
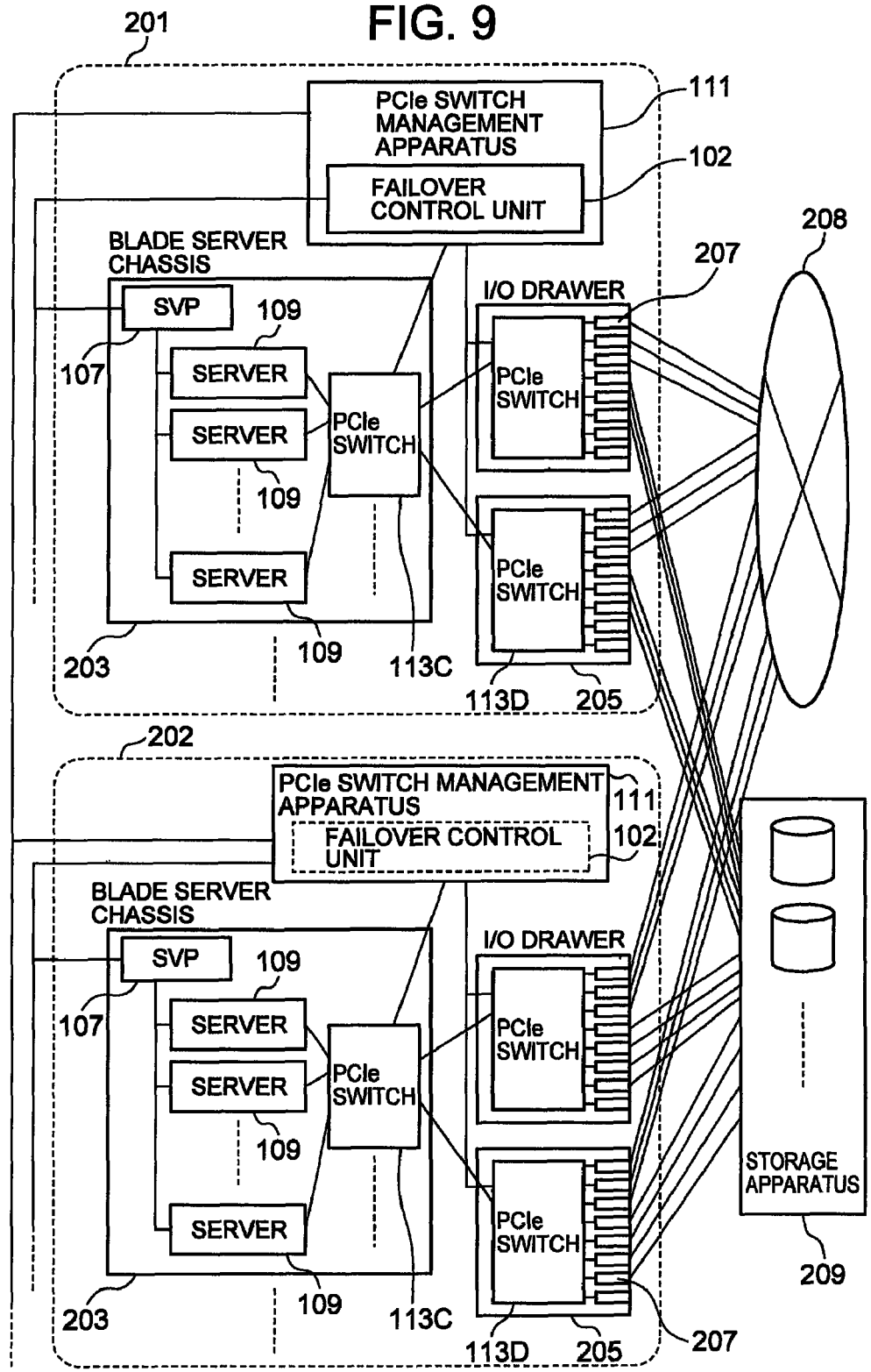
FIG. 9 shows the configuration of a computer system group relating to a second embodiment of the present invention.

When the system decided at S606 has been selected, the failover control unit 102 carries out a server switching process including steps S607 and S608 on the basis of the unused server (spare server) and the unused I/O devices relating to that system. FIG. 7 shows an overview of a switching process.

More specifically, the failover control unit 102 issues an instruction, via the I/O configuration management unit 104, to the PCIe switch management apparatus 111 in system B which includes the unused server 702 forming the failover destination, to allocate the selected I/O devices (the four I/O devices corresponding to the bus numbers "3", "19", "60" and "61" which are shaded in gray in FIG. 5) to the spare server 702 (step 607 in FIG. 6, (1) in FIG. 7). Upon receiving this instruction, the I/O configuration information acquisition unit 112 in the PCIe switch management apparatus 111 allocates the designated I/O devices to the designated spare server 702 by changing the settings of the PCIe switches 113C and 113D (more specifically, for example, the I/O switch 113C which is connected to the spare server that is inserted in slot 6, and the I/O switch 113D which corresponds to the bus number "3", "19", "60" and "61"). As a result of this, for example, in the connection topology information table (see FIG. 13) which is managed by the PCIe switch management apparatus 111 in system B, the I/O number "4" and the bus numbers "3", "19", "60" and "61" are allocated to the chassis ID and slot number corresponding to the spare server 702.

Thereupon, when the change of allocation of the I/O devices has been completed, the failover control unit 102, operating via the server configuration management unit 103, instructs both the SVP 107 controlling the current server 701 and the SVP 107 controlling the spare server 702 to change the identifiers of the I/O devices (step 608 in FIGS. 6 and (2) in FIG. 7). The process of changing identifiers can adopt the first technology which was described above. Here, for example, the identifiers of the I/O devices allocated to the faulty server 701 and the identifiers of the I/O devices which have been allocated to the spare server 702 are exchanged.

By changing the identifiers of the I/O devices, it is possible for the storage area (for example, the system volume described above) which was being used by the current server 701 to be used directly by the spare server 702. In this state, the failover control unit 102 instructs the SVP 107 which controls the spare server 702 to start up the spare server 702 ((3) in FIG. 7). Upon receiving this instruction, the SVP 107 switches on the power to the spare server 702 and thereby starts up the spare server 702. The spare server 702 starts up a read command by loading the OS, application, or the like, which was being run by the faulty server 701, via the boot device allocated to the spare server 702.

When the spare server 702 has been started up, the failover control unit 102, operating via the I/O configuration management unit 104, instructs the PCIe switch management apparatus 111 of system A to terminate the allocation of the I/O devices which are allocated to the faulty server 701 (in FIG. 3, these are the four I/O devices corresponding to the bus numbers "3", "22", "31", and "32") ((4) in FIG. 7). Upon receiving this instruction, the PCIe switch management apparatus 111 terminates the allocation of the designated I/O devices. When the termination of allocation has been completed, the failover control unit 102 amends the configuration information table 106, in other words, reflects the contents of the configuration changes performed in the series of processes, in the configuration information table 106.

By this means, the server switching process is completed. In the server switching process, when (1) in FIG. 7 (step 607 in FIG. 6) has been carried out, the server selection unit 105 removes the record corresponding to the spare server 702 form the unused server information table, removes the record corresponding to the I/O devices which have been allocated to the spare server 702 from the unused I/O device information table, and adds a record relating to the spare server 702 and the I/O devices allocated to the spare server 702, to the machine in use information table. Furthermore, when (2) in FIG. 7 (step 608 in FIG. 6) has been carried out, the server selection unit 105 updates the identifier 310 of the record added to the machine in use information table, to the identifier 310 of the I/O device allocated to the current server 701, and similarly, updates the identifier 310 of the I/O device allocated to the current server 701, to the identifier of the I/O device allocated to the spare server 702. Furthermore, when (4) in FIG. 7 has been carried out, for example, the server selection unit 105 removes the record corresponding to the server 701 from the machine in use information table, adds the information relating to the server in that record to the unused server information table, and adds the information relating to the I/O devices in that record to the unused I/O device information table.

The foregoing was a description of a first embodiment of the present invention.

In the present embodiment, for example, steps 605 and 606 shown in FIG. 6 do not necessarily have to be carried out. In other words, if an affirmative judgment result has been obtained in each one of steps 603 and 604 when one system B is searched as a system other than system A, step 607 may be carried out rather than carrying out steps 605 and 606. Stated alternatively, if one candidate has been obtained, step 607 may be carried out.

Second Embodiment

Next, a second embodiment of the present invention will be described. The following description will focus on differences with respect to the first embodiment, and points which are common with the first embodiment are either omitted or are explained briefly.

In the second embodiment, the server management apparatus 101 is not provided and the failover control unit is provided in an apparatus other than the server management apparatus, for example, the PCIe management apparatus 111.

FIG. 10 shows the main functions in the second embodiment of the present invention, and FIG. 11 shows the composition of a computer system group relating to the second embodiment of the present invention.

A failover control unit 102 is provided inside the PCIe switch management apparatus 111 of each system, and all of the PCIe switch management apparatuses 111 are connected in a communicable fashion via the communications network. Furthermore, each SVP 107 is connected to the PCIe switch management apparatus 111 of the computer system to which it belongs.

A priority order is determined in advance, for example, for the failover control units 102, and the unit having the highest priority is taken as a master unit. The master unit performs similar processing to that of the failover control unit 102 in the first embodiment. The failover control units 102 of other systems form assistant units, which send instructions to the servers from the master units (for example, power on/off to the servers, change to I/O device identifiers, and the like), to the SVP under their control, and transfer information sent from the SVP 107, such as a fault notification, server information, or the like, to the master unit.

The failover control units 102 monitor their respective states periodically, and if a fault occurs in the failover control unit 102 which is the master unit, then a failover control unit 102 which is to become the master unit is recognized in accordance with the priority order, and the failover control unit 102 selected as the new master unit rapidly takes over the processing of the master unit.

Apart from these points, the failover control units 102 in the second embodiment perform similar processing to the first embodiment.

By this means, even if a computer system group is not provided with the server management apparatus, it is possible to achieve failover processing similar to the first embodiment.

In the foregoing, desirable embodiments of the present invention were described, but the present invention is not limited to these embodiments, and it may of course be modified in various ways without departing from the essence of the invention. For example, switches of another type may be used instead of the PCIe switches. In other words, the communications between the servers and the switches are not limited to PCI-Express, and an interface of another type may be used. Furthermore, for example, in steps 601 and 603, the models does not necessarily have to match completely. For example, even if the model of server is different, provided that the model of server is substantially the same (in other words, provided that the relationship is such that the same microprocessor is recognized by the OS), then a server can be selected as a spare server (for example, it is possible to select a spare server which is of a different version to the faulty server by is substantially the same as the faulty server).

What is claimed is:

1. A computer system group, comprising:
a plurality of computer systems; and
a failover control unit,
wherein the computer systems each comprise:
a plurality of servers;
a plurality of I/O devices; and
one or more I/O switches coupled to the plurality of servers and the plurality of I/O devices,
wherein the server can access an external apparatus via any I/O device of one or more I/O devices which are allocated to that server, by means of the I/O switch, and the combination of the servers and I/O devices can be changed in each computer system, and wherein the failover control unit:
(1-1) judges whether or not there exists a spare server capable of taking over processing in a computer system having a faulty server which is a current server that has generated a fault;
(1-2) searches for another computer system capable of constructing a particular combination corresponding to the combination of the faulty server and the I/O devices allocated thereto, if a judgment result in (1-1) is negative; and
(1-3) executes a server switching process, and in this server switching process, performs combination construction processing for constructing the particular combination in the other computer system by allocating particular I/O devices located in the same computer system as the spare server capable of taking over processing which is located in the other computer system, identifier exchange processing for exchanging identifiers of the I/O devices which have been allocated to the faulty server with identifiers allocated to the particular I/O devices, and start-up processing for starting up the spare server capable of taking over processing.

2. The computer system group according to claim 1, wherein a plurality of I/O devices allocated to one server comprise at least one boot device and at least one non-boot device,
the boot device is an I/O device, which coupled to a storage apparatus that is one of the external apparatuses, and which is used to access a system area in the storage apparatus, the system area being a storage area in which information required to start up the server is stored,
the non-boot device is an I/O device other than a boot device,
a storage resource is further provided which stores:
use management information including information relating to a current server and information relating to I/O devices allocated to the current server;
unused server management information including information relating to a spare server; and
unused I/O device management information including information relating to unused I/O devices which are I/O devices that are not allocated to any server,
the use management information includes, for each current server, server position information representing where the server is provided, attribute information of the server, and an I/O number representing the number of I/O devices allocated to the server; and includes, for each I/O device allocated to the server, I/O position information representing where the I/O device is provided, I/O attribute information which is attribute information of the I/O device, boot information representing whether or not the I/O device is a boot device, and an I/O identifier which is an identifier of the I/O device,
the unused server management information includes, for each spare server, server position information representing where the server is provided, and attribute information of the server,
the unused I/O device management information includes, for each I/O device, I/O position information representing where the device is provided, I/O attribute information, boot information and an I/O identifier,
in (1-2), the failover control unit:
(1-2-1) searches for, based on the use management information and the unused I/O device management information, another computer system in which there exists a particular boot device which corresponds to I/O position information that is the same as the I/O position information corresponding to the boot device allocated to the faulty server and which corresponds to I/O attribute information that matches the I/O attribute information corresponding to the boot device allocated to the faulty server;
(1-2-2) judges whether or not there is a spare server capable of taking over processing, in the other computer system searched in (1-2-1), on the basis of the use management information and the unused server management information; and
(1-2-3) judges, by referring to the unused I/O device management information, whether or not there exist, in the other computer system searched in (1-2-1), respective particular non-boot devices corresponding to I/O attribute information that matches the I/O attribute information corresponding to the respective non-boot devices allocated to the faulty server,
(1-3) is carried out if the judgment results of both (1-2-2) and (1-2-3) are affirmative,
the particular I/O devices are the particular boot device and the non-boot device in (1-3), and
the spare server capable of taking over processing is a spare server corresponding to attribute information that matches the attribute information corresponding to the faulty server.

3. The computer system group according to claim 1, wherein the computer systems each comprise:
a service management apparatus which manages information relating to the respective servers in the computer system; and
a switch management apparatus which is coupled to the I/O switches in the computer system and manages information relating to the I/O devices, and
the failover control unit:
(3-1) gathers information relating to the server in each of the computer systems from the service management apparatus in the computer system;
(3-2) gathers information relating to the I/O devices in each of the computer systems from the switch management apparatus in the computer system; and
(3-3) constructs the use management information, the unused server management information and the unused I/O device management information, on the basis of the information gathered in (3-1) and (3-2) above.

4. The computer system group according to claim 1, wherein another computer system having a particular boot device as one of the particular I/O devices is searched in (1-2),
the boot device is an I/O device, which is coupled to a storage apparatus that is one of the external apparatuses, and which is used to access a system area in the storage apparatus, and
the system area is a storage area in which information required to start up the server is stored.

5. The computer system group according to claim 4, wherein the particular boot device is a boot device situated in a position corresponding to the boot device allocated to the faulty server and having attributes which match the attributes of that boot device.

6. The computer system group according to claim 1,
wherein there is a non-boot device, which is an I/O device other than the boot device, among the particular I/O devices, and
the particular non-boot device is a non-boot device having attributes which match the attributes of the boot device allocated to the faulty server.

7. The computer system group according to claim 1, wherein, in (1-1) and (1-2), the failover control unit refers to configuration management information which is information relating to the respective servers and I/O devices.

8. The computer system group according to claim 7, wherein, in the configuration management information, the information relating to the current server and the information relating to the I/O devices allocated to the current server are managed as the same information, and the spare server and the unused I/O devices are managed as respective separate information.

9. The computer system group according to claim 1,
wherein the computer systems each comprise a switch management apparatus coupled to the respective I/O switches in the computer system,
the failover control unit is provided in a server management apparatus which manages the plurality of computer systems, and
in the combination construction process, the failover control unit instructs the switch management apparatus in the other computer system having the spare server capable of taking over processing and the I/O devices, to allocate the particular I/O devices to the spare server capable of taking over processing, and the switch management apparatus which has received this instruction allocates the particular I/O devices to the spare server capable of taking over processing by changing the setting of the I/O switch coupled to the spare server capable of taking over processing and of the I/O switch coupled to the particular I/O devices.

10. The computer system group according to claim 1,
wherein the computer systems each comprise a switch management apparatus coupled to the respective I/O switches in the computer system,
the failover control unit is provided in the switch management apparatus of each computer system, and
the failover control unit which has the highest priority functions as a master unit, and the other failover control units function as slave units.

11. A control apparatus which controls failover of servers in a computer system group including a plurality of computer systems,
wherein the computer systems each comprise:
a plurality of servers;
a plurality of I/O devices; and
one or more I/O switches coupled to the plurality of servers and the plurality of I/O devices,
the server can access an external apparatus via any I/O device of one or more I/O devices which are allocated to that server, by means of the I/O switch, and the combination of the servers and I/O devices can be changed in each computer system,
wherein the control apparatus comprises:
a judgment unit which judges whether or not there exists a spare server capable of taking over processing in a computer system having a faulty server which is a current server that has generated a fault;
a search unit which searches for another computer system capable of setting up a particular combination corresponding to the combination of the faulty server and the I/O devices allocated thereto, if the judgment result of the judgment unit is negative; and
a server switching unit which executes a server switching process, and
wherein in the server switching process, the server switching unit performs combination construction processing for constructing the particular combination in the other computer system by allocating particular I/O devices located in the same computer system as the spare server capable of taking over processing which is located in the other computer system, identifier exchange processing for exchanging identifiers of the I/O devices which have been allocated to the faulty server with identifiers allocated to the particular I/O devices, and start-up processing for starting up the spare server capable of taking over processing.

12. A method for controlling failover of servers in a computer system group including a plurality of computer systems,
the computer systems each comprising:
a plurality of servers;
a plurality of I/O devices; and
one or more I/O switches coupled to the plurality of servers and the plurality of I/O devices,
the server being able to access an external apparatus via any I/O device of one or more I/O devices which are allocated to that server, by means of the I/O switch, and the combination of the servers and I/O devices being able to be changed in each computer system,
the method comprising the steps of:
(11-1) judging whether or not there exists a spare server capable of taking over processing in a computer system having a faulty server which is a current server that has generated a fault;
(11-2) searching for another computer system capable of constructing a particular combination corresponding to the combination of the faulty server and the I/O devices allocated thereto, if a judgment result in (11-1) is negative; and
(11-3) executing a server switching process, and in this server switching process, performing combination construction processing for constructing the particular combination in the other computer system by allocating particular I/O devices located in the same computer system as the spare server capable of taking over processing which is located in the other computer system, identifier exchange processing for exchanging identifiers of the I/O devices which have been allocated to the faulty server with identifiers allocated to the particular I/O devices, and start-up processing for starting up the spare server capable of taking over processing.

13. The failover control method according to claim 12,
wherein a plurality of I/O devices allocated to one server comprise at least one boot device and at least one non-boot device,
the boot device is an I/O device, which is coupled to a storage apparatus that is one of the external apparatuses, and which is used to access a system area in the storage apparatus, the system area being a storage area in which information required to start up the server is stored,
the non-boot device is an I/O device other than the boot device,
a storage resource is further provided which stores:
use management information including information relating to a current server and information relating to I/O devices allocated to the current server;
unused server management information including information relating to a spare server; and
unused I/O device management information including information relating to unused I/O devices which are I/O devices that are not allocated to any server,
the use management information includes, for each current server, server position information representing where the server is provided, attribute information of the server, and an I/O number representing the number of I/O devices allocated to the server; and includes, for each I/O device allocated to the server, I/O position information representing where the I/O device is provided, I/O attribute information which is attribute information of the I/O device, boot information representing whether or not the I/O device is a boot device, and an I/O identifier which is an identifier of the I/O device, the unused server management information includes, for each spare server, server position information representing where the server is provided, and attribute information of the server, the unused I/O device management information includes, for each I/O device, I/O position information representing where the device is provided, I/O attribute information, boot information and an I/O identifier, wherein in (11-2), the method comprises the steps of:

(11-2-1) searching for another computer system in which there exists a particular boot device which corresponds to I/O position information that is the same as the I/O position information corresponding to the boot device allocated to the faulty server and which corresponds to I/O attribute information that matches the I/O attribute information corresponding to the boot device allocated to the faulty server, (11-2-2) judging whether or not there is a spare server capable of taking over processing, in the other computer system searched in (11-2-1), on the basis of the use management information and the unused server management information, and (11-2-3) judging, by referring to the unused I/O device management information, whether or not there exist, in the other computer system searched in (11-2-1), respective particular non-boot devices corresponding to I/O attribute information that matches the I/O attribute information corresponding to the respective non-boot devices allocated to the faulty server, and wherein (11-3) is carried out if the judgment results of both (11-2-2) and (11-2-3) are affirmative, the particular I/O devices are the particular boot device and the non-boot device in (11-3), and the spare server capable of taking over processing is a spare server corresponding to attribute information that matches the attribute information corresponding to the faulty server.

14. The failover control method according to claim 13, wherein the computer systems each comprise:

a service management apparatus which manages information relating to the respective servers in the computer system; and a switch management apparatus which is coupled to the I/O switches in the computer system and manages information relating to the I/O devices, and wherein the method further comprises the steps of:

(13-1) gathering information relating to the server in each of the computer systems from the service management apparatus in the computer system;

(13-2) gathering information relating to the I/O devices in each of the computer systems from the switch management apparatus in the computer system; and (13-3) constructing the use management information, the unused server management information and the unused I/O device management information, on the basis of the information gathered in (3-1) and (13-2) above.

15. The failover control method according to claim 12, wherein another computer system having a particular boot device as one of the particular I/O devices is searched in (11-2), the boot device is an I/O device, which is coupled to a storage apparatus that is one of the external apparatuses, and which is used to access a system area in the storage apparatus, and the system area is a storage area in which information required to start up the server is stored.

16. The failover control method according to claim 15, wherein the particular boot device is a boot device situated in a position corresponding to the boot device allocated to the faulty server and having attributes which match the attributes of that boot device.

17. The failover control method according to claim 12, wherein there is a non-boot device, which is an I/O device other than the boot device, among the particular I/O devices, and the particular non-boot device is a non-boot device having attributes which match the attributes of the boot device allocated to the faulty server.

18. The failover control method according to claim 12, wherein, in (11-1) and (11-2), reference is made to configuration management information which is information relating to the respective servers and I/O devices.

19. The failover control method according to claim 18, wherein, in the configuration management information, the information relating to the current server and the information relating to the I/O devices allocated to the current server are managed as the same information, and the spare server and the unused I/O devices are managed as respective separate information.

* * * * *